(No Model.)
L. A. DE LIME.
APPARATUS FOR REFINING, PURIFYING, AND AGING ALCOHOLIC LIQUORS.
No. 267,065. Patented Nov. 7, 1882.
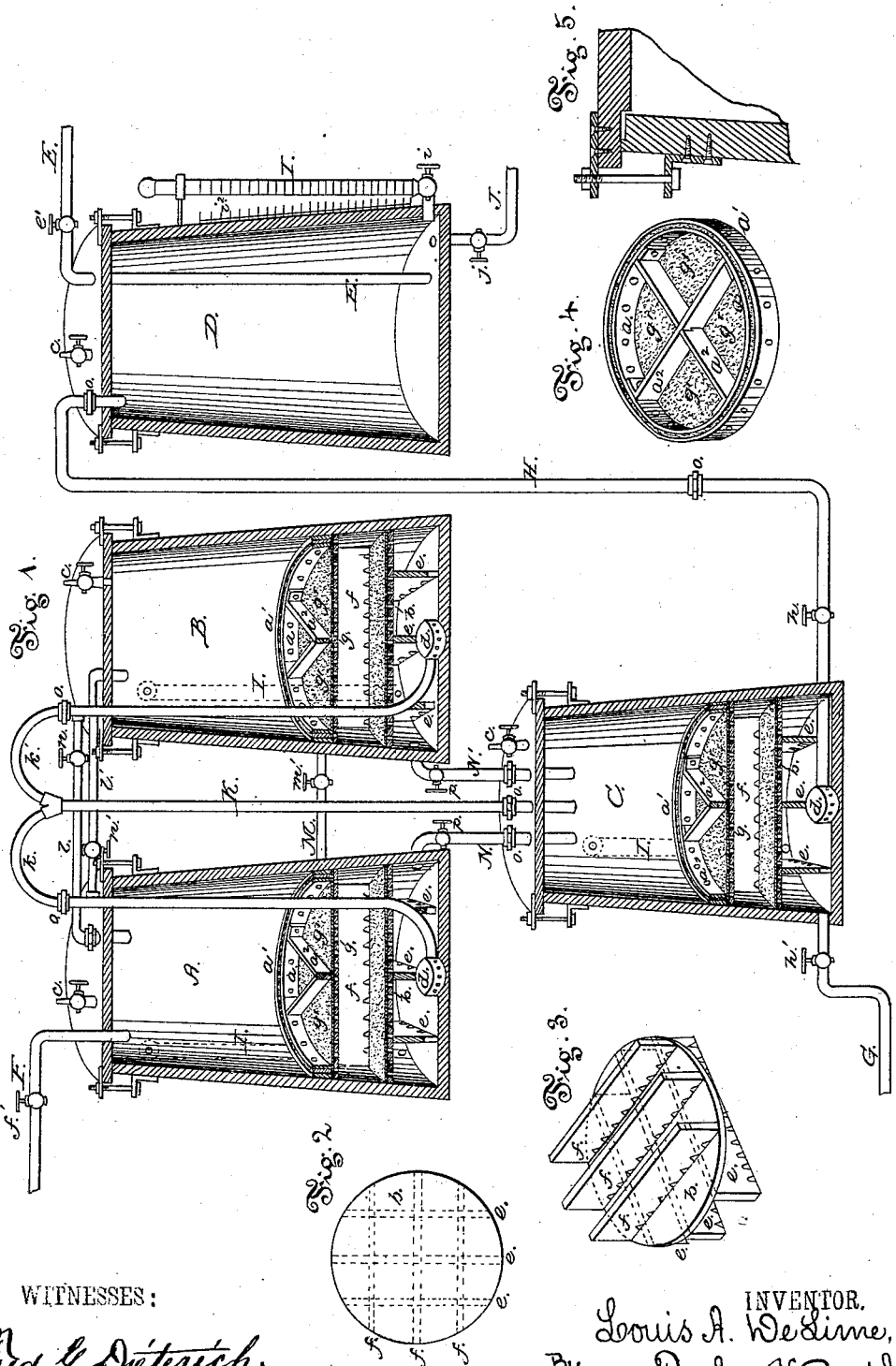
WITNESSES:
Fred. G. Dieterich
G. Fred Keller
INVENTOR.
Louis A. De Lime,
By Parker & Sweet Jr.,
ATTORNEYS.
N. PETERS, Photo-Lithographer, Washington, D. C.

UNITED STATES PATENT OFFICE.

LOUIS A. DE LIME, OF FRANKFORT, KENTUCKY.

APPARATUS FOR REFINING, PURIFYING, AND AGING ALCOHOLIC LIQUORS.

SPECIFICATION forming part of Letters Patent No. 267,065, dated November 7, 1882.

Application filed September 30, 1882. (No model.)

*To all whom it may concern:*

Be it known that I, LOUIS A. DE LIME, a citizen of the United States, residing at Frankfort, in the county of Franklin and State of Kentucky, have invented certain new and useful Improvements in Apparatus for Refining, Purifying, and Aging Alcoholic Spirits; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in that class of apparatus for purifying, refining, and aging alcoholic liquids by the oxidation of the fusel-oil and the separation of the various ethers and gaseous substances which injure the liquors, as set forth in United States Letters Patent No. 93,286, granted to me under date of August 3, 1869; and my present improvements consist essentially of a novel and simplified construction and arrangement of a number of hermetically-sealed tubs or tanks having a series of connecting-pipes, whereby air under atmospheric pressure is so distributed by the displacement of the air contents of each tub or tank as to mingle with and pass through the liquor to be treated and oxidize the fusel-oil contained therein, and separate and carry off the various ethers and gaseous substances which injure the liquors, yet at the same time preserving and developing the natural flavor or bouquet of the same, all as will be hereinafter more fully described, and specifically designated in the claim.

In the accompanying drawings, Figure 1 represents a vertical section of my complete apparatus; Fig. 2, a detail plan view of the arrangement of the upright partitions; Fig. 3, a detail perspective view of the same; Fig. 4, a detail perspective view of the means for holding and stretching the blankets; and Fig. 5, a detail sectional view, showing the manner of securing the covers and tanks together.

Similar letters of reference indicate like parts in the several figures.

Referring to the drawings, A, B, and C represent the tubs or tanks for receiving and treating the liquor, the two tubs A and B being arranged side by side and directly above the lower tub, C, as shown.

D represents a tub or tank connected by the pipe H to the bottom of the lower tub, C, and which is adapted to be used as an auxiliary air-reservoir, the air in which is forced out into the tubs A, B, and C by a pressure of water introduced in said tank through the supply-pipe E, which runs down into the said tank within a couple of inches from its bottom, and which is provided with the stop-cock $e'$, as shown. All of the tanks are provided with covers lined with copper upon their lower surfaces, and which rest upon a gasket or india-rubber packing arranged in a groove around the top of each tub or tank, a suitable number of fastening-clamps, $e^3$, being disposed at equal distances apart around each cover to draw the said covers down upon the tubs and hermetically seal the same, as fully shown in Fig. 5.

About half-way from the bottom of each of the tubs A, B, and C is arranged a false bottom, $g$, which is perforated and covered with a blanket, $g'$, which is supported and arranged between the clamping-hoops $a\ a'$, having cross-braces $a^2$ to prevent the blanket from bulging up in the center, said supporting-hoops being secured to the inner sides of each tank, as shown.

Midway between the false bottom $g$ and the bottom of each tank is arranged another false and perforated bottom, $b$, covered also with a blanket, $b'$, the space between the two false bottoms $g$ and $b$ being divided into chambers by partitions $f$, said chambers being filled with a layer of fine gravel having a top layer of coarse maple-charcoal, while the space between the lower false bottom, $b$, and the bottom of each tank is divided into air-chambers by partitions $e$, which run across the tub at right angles to the partitions $f$, said air-chambers being connected by small openings in the bottom of each partition, as fully shown in Fig. 3.

All of the tanks are provided with vent-pipes $c$ in their lids or covers, while upon one side of each tank is arranged a glass tube, I, connected by a pipe to the interior lower parts of the same, so that the height of the liquor in each tank may be readily determined at all times, said tube I being provided with a suitable stop-cock, $i$, at the bottom, as shown.

Upon the sides of each tank is secured a graduated strip, $i^2$, whereby the gallon-contents of each tank may be ascertained at any time.

K represents an air-pipe, passing upward from the lower tank, C, above the tops of the tanks A and B, where it merges into the connections $k$ $k'$, which run down through the covers to the bottoms of said tanks, respectively, into a circular box, $d$, provided with perforations around the sides, which is arranged directly in the center of each bottom, as shown, said pipe K and its connections being provided with suitable couplings, $o$, to permit of the easy removal of said pipes when the tanks are to be cleaned. A pipe, $l$, is attached to the connecting-pipe $k'$ at one end and at the opposite end to the tank A, while a similar pipe, $l'$, is connected to the pipe $k$ and to the tank B, whereby a passage is maintained between the two tanks, said pipes $l$ $l'$ being provided with stop-cocks $n$ $n'$ and couplings $o$, as shown.

F represents a pipe for supplying the liquors to be treated to the tank A, said pipe being provided with a suitable stop-cock, $f'$, as shown. The two tanks A and B are also connected by the pipe M directly above the upper false bottoms, $g$, said pipe being provided with a stop-cock, $m'$, as shown. The two tanks A and B are also connected to the lower tank, C, by means of the pipes N N', running from the bottoms of the upper tanks into the lower tank, C, through its cover, said pipes being also provided with suitable stop-cocks and couplings, as shown. The bottom of the tank D is provided with a suitable waste-pipe, J, having a stop-cock, $j$, while the bottom of the tank C is provided with a similar pipe, G, having stop-cock $h'$ for drawing off the liquor after it has been treated.

The construction of my invention being as already described, it will be observed that in the operation of the same the distilled liquor is supplied or pumped up to the pipe F into the tank A until said tank is filled to within six inches of its top, and the pipe $l$ being opened the air is driven out through the same into the tank B. The pipe $l$ is now closed by the stop-cock $n$ and the connecting-pipe M opened by the stop-cock $m'$, causing the liquor in tank A to rush through into the tank B until the liquor is on a level in both tanks, and in the meantime forcing the compressed air in tank B up through the pipe $l'$ into the connecting-pipe $k$, down to the circular box $d$ in the bottom of the tank A, from whence it passes up through the liquor and oxidizes the fusel-oil contained therein, as also to drive out all of the various ethers and gaseous substances which injure the quality of said liquor. The pipe M is now closed, and more whisky is allowed to flow into the tank A through the pipe F until again filled to within six inches of the top, the air being driven out again from the tank A through the pipe $l$ into the pipe $k'$, down to the circular box $d$ in the bottom of the tank B, and from thence up through the liquor in the same. The pipe M is again opened between the two tanks, and the liquor in tank A rushes through into the tank B until it is on a level in both tanks, the air, as before described, being driven out through the pipe $l'$ into the pipe $k$, down to the circular box $d$ in the bottom of the tank A, and up through the liquor; and this operation is repeated until both of the tanks A and B are filled with the liquor. The pipes N N' are now opened at the bottom of the tanks A B and the liquor allowed to run down into the lower tank, C, which displaces the air contained therein and forces it up through the central pipe, K, down through the connections $k$ $k'$, into the perforated boxes $d$ in the bottom of the tanks A and B, and up through the liquor contained in the same. The vent-pipes $c$ are then opened to allow of the escape of the various ethers and gaseous substances which have been driven out from the liquor. Where an extra current or force of air is necessary in the treatment of the liquor or the forcing out of the ether and gaseous substances, it is supplied from the air-tank D, through the pipe H, which runs down to the central part of the bottom of the tank C, and up through the same into the tanks A and B, out through the vents $c$. The air is forced out of the upper part of the said tank D by letting in a sufficient supply of water through the pipe E, the waste-pipe J being used to run off the water to secure another supply of air in the tank through the vent-pipe $c$. The liquor thus treated is drawn off from the tank C through the pipe G into a suitable receiver or cistern, and is then ready to be barreled for use. The blankets in the tubs A, B, and C may be removed and cleaned at any time, it only being necessary to do so generally in three months.

By means of my improved apparatus I am enabled to purify and refine alcoholic spirits in from three-quarters to one hour, according to the quality of the liquor, in such a manner as to give it a superior quality, ready for immediate use, by the oxidation of the fusel-oil and the expulsion of the various ethers and gaseous matters which injure the quality of the liquors, yet at the same time preserving and developing the natural flavor of the liquor. Alcoholic spirits treated by my process will "age" in one year as much as other spirits not so treated will in two years, and in two years will age more than other spirits not treated by my process will in five years.

Having thus described my invention, what I claim as new and useful is—

In an apparatus for purifying and refining alcoholic spirits, the tanks A, B, and C, having connecting-pipes to and with each other, and provided with the perforated divisions having filtering materials and blankets, as described, said divisions being located in each tank, as specified, whereby chambers *e* and *f* are formed, in combination with an auxiliary air-tank having a suitable air-supply, and a pipe connecting said air-tank with the lower tank, C, all substantially as and for the purpose described.

In testimony whereof I affix my signature in presence of two witnesses.

L. A. DE LIME.

Witnesses:
 PARKER H. SWEET, Jr.,
 C. FRED KELLER.